UNITED STATES PATENT OFFICE.

HENRY C. FREIST, OF PHILADELPHIA, PENNSYLVANIA, ASSIGNOR TO HARRISON BROTHERS & CO., OF SAME PLACE.

MANUFACTURE OF CRYSTAL ALUM.

SPECIFICATION forming part of Letters Patent No. 328,477, dated October 20, 1885.

Application filed July 16, 1885. Serial No. 171,763. (No specimens.)

*To all whom it may concern:*

Be it known that I, HENRY C. FREIST, of the city and county of Philadelphia and State of Pennsylvania, have invented a new and improved method of producing from kaolin, bauxite, or other of the commonly-employed aluminous materials containing iron, a commercial crystal alum—such as potash, ammonia, or soda alum—free or nearly free from iron, and fit to be employed in dyeing, calico-printing, or for other purposes for which alum free from iron is required, of which the following is a specification.

The following description will enable those skilled in the art to which my invention appertains to practice it.

The kaolin, bauxite, or other aluminous material employed is first treated with sulphuric acid according to any one of the usual methods for producing from such raw materials a ferruginous solution of sulphate of alumina. This solution of sulphate of alumina and iron is allowed to settle, or is otherwise cleared by any of the well-known methods. The cleared solution is removed into a suitable vessel, and is treated with an oxidizing agent—such, for example, as chloride of potash, nitric acid, or chlorine—to transform ferrous oxide into ferric oxide. The quantity of oxidizing agent to be employed is governed by the quantity of protosulphate of iron present in the solution of sulphate of alumina to be treated. The oxidizing process is to be carried to the point at which no protoxide of iron can be detected in the solution. In carrying out the foregoing method I preferably, although not necessarily, employ solutions in a hot or boiling condition. After the iron has been brought to the state of a peroxide, and the impurities settled out, the clear liquor is drawn off. To this clear liquor there is now to be added such quantity of sulphate of potash, or sulphate of ammonia, or sulphate of soda as is required to form a compound consisting of a sulphate of alumina and a sulphate of one or more of said alkalies. The solution, if necessary, is boiled down to the required density to form crystals, is allowed to cool, and is left to crystallize.

The persulphate of iron which has been formed by the above-described oxidizing treatment, being more soluble than the protosulphate of iron, remains in the mother-liquor, with the result that crystal alum free or nearly free from iron is produced.

I am aware that British Letters Patent No. 732, dated February 15, 1882, were granted to William Gentles for an improvement in the manufacture of sulphate of alumina.

My invention differs from that set forth in said patent, inasmuch as I produce by the process described crystal alum or a double salt consisting of sulphate of alumina and one or more of the alkaline sulphates. In the process set forth in said patent iron is removed by hydro-extractors, or by other mechanical means. In my process the iron is oxidized, and is in the sulphate-of-alumina solution formed into a soluble salt, and remains in the mother-liquor after the crystal alum has been crystallized therefrom.

The sulphate of alumina or single salt resulting from the process set forth in said patent is not, without further treatment, a commercially-marketable article, whereas the product resulting from the process hereinbefore described and hereinafter claimed is a finished and marketable product.

Having thus described my invention, I claim—

The method of making crystal alum free or nearly free from iron, which consists in treating a solution of sulphate of alumina containing iron with chlorate of potash or other equivalent oxidizing agent to convert ferrous oxide into ferric oxide, and in adding to said solution, either before or after the impurities have been settled out or otherwise removed therefrom, sulphate of potash, or sulphate of ammonia, or sulphate of soda, and crystallizing the alum from said solution, as specified.

In testimony whereof I have hereunto signed my name this 10th day of July, A. D. 1885.

HENRY C. FREIST.

In presence of—
   J. BONSALL TAYLOR,
   W. C. STRAWBRIDGE.